US009166454B2

(12) United States Patent
Chun et al.

(10) Patent No.: US 9,166,454 B2
(45) Date of Patent: Oct. 20, 2015

(54) ELECTRIC MOTOR WITH END WINDING SUPPORT

(71) Applicant: LG Electronics Inc., Seoul (KR)

(72) Inventors: Kwangwook Chun, Seoul (KR); Seungdo Han, Seoul (KR); Sunguk Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 13/711,302

(22) Filed: Dec. 11, 2012

(65) Prior Publication Data

US 2014/0091670 A1    Apr. 3, 2014

(30) Foreign Application Priority Data

Oct. 2, 2012    (KR) .................. 10-2012-0109668

(51) Int. Cl.
| | | |
|---|---|---|
| *H02K 3/46* | (2006.01) | |
| *H02K 3/00* | (2006.01) | |
| *H02K 3/50* | (2006.01) | |
| *H02K 3/52* | (2006.01) | |
| *H02K 3/487* | (2006.01) | |

(52) U.S. Cl.
CPC .. *H02K 3/46* (2013.01); *H02K 3/00* (2013.01); *H02K 3/487* (2013.01); *H02K 3/50* (2013.01); *H02K 3/52* (2013.01)

(58) Field of Classification Search
CPC ............ H02K 3/46; H02K 3/345; H02K 4/87
USPC .................................. 310/215, 194, 214, 65
See application file for complete search history.

(56) References Cited

U.S. PATENT DOCUMENTS

| | | | | |
|---|---|---|---|---|
| 3,558,950 | A * | 1/1971 | Raybould | 310/270 |
| 3,634,709 | A * | 1/1972 | Le Henaff | 310/214 |
| 4,091,301 | A * | 5/1978 | Blank | 310/270 |
| 4,275,324 | A * | 6/1981 | Flick | 310/270 |
| 6,366,001 | B1 * | 4/2002 | Gunnarsson et al. | 310/270 |
| 6,864,617 | B1 * | 3/2005 | Wang et al. | 310/270 |
| 8,004,145 | B2 * | 8/2011 | Yanagisawa et al. | 310/270 |
| 2003/0042818 | A1 * | 3/2003 | Tornquist et al. | 310/218 |
| 2005/0212373 | A1 * | 9/2005 | McDowall et al. | 310/214 |
| 2006/0071569 | A1 * | 4/2006 | Stewart et al. | 310/194 |
| 2008/0252155 | A1 * | 10/2008 | Waddell et al. | 310/58 |
| 2013/0106211 | A1 * | 5/2013 | Holzner | 310/62 |

FOREIGN PATENT DOCUMENTS

| | | |
|---|---|---|
| CN | 101908782 A | 12/2010 |
| CN | 102088217 A | 6/2011 |

(Continued)

OTHER PUBLICATIONS

Iykovic, Zoran, Brushless DC Motor with Permanent Magnet Rotor, Jan. 9, 1992, Vdo Schindling, English Machine Translation.*

*Primary Examiner* — Terrance Kenerly
*Assistant Examiner* — Alexander Singh
(74) *Attorney, Agent, or Firm* — Dentons US LLP

(57) ABSTRACT

An electric motor includes a stator, a case surrounding the stator, and a rotor rotatably disposed with respect to the stator. The rotor includes a rotor core having a plurality of poles and slots, a shaft coupled to a central portion of the rotor core, a rotor coil wound on the rotor core, and coil supporting members provided at the rotor core. The coil supporting members are configured to support the rotor coil such that the rotor coil is prevented from being separated from the rotor core in a radial direction when the rotor rotates. Under such a configuration, a short-circuit of the rotor coil due to a centrifugal force when the rotor rotates, can be prevented.

13 Claims, 17 Drawing Sheets

(56) References Cited

FOREIGN PATENT DOCUMENTS

| | | |
|---|---|---|
| CN | 202260706 U | 5/2012 |
| DE | 4021599 A1 * | 1/1992 |
| JP | 2009-284579 | 12/2009 |
| KR | 20-0166027 | 10/1999 |
| KR | 20-0206559 | 10/2000 |
| KR | 10-2002-0081395 | 10/2002 |
| KR | 10-0768248 | 10/2007 |

* cited by examiner

ELECTRIC MOTOR WITH END WINDING SUPPORT

CROSS-REFERENCE TO RELATED APPLICATION

Pursuant to 35 U.S.C. §119(a), this application claims the benefit of earlier filing date and right of priority to Korean Application No. 10-2012-0109668, filed on Oct. 2, 2012, the contents of which is incorporated by reference herein in its entirety.

BACKGROUND

1. Field of the Disclosure

The present disclosure relates to an electric motor, and particularly, to an electric motor capable of preventing the occurrence of a short-circuit of a rotor.

2. Background

As is well known, an electric motor is commonly a rotary electric machine for converting electric energy into mechanical energy.

FIG. 1 is a sectional view of an electric motor in accordance with the conventional art, and FIG. 2 is a sectional view of a rotor of FIG. 1.

As shown in FIG. 1, the electric motor includes a stator 20, and a rotor 30 rotatably disposed with respect to stator 20. A frame or a case 10 is provided outside stator 20. A bearing 12 for rotatably supporting the rotor 30 is provided at the case 10. Stator 20 includes a stator core 22, and a stator coil 24 wound on stator core 22.

The rotor 30 includes a shaft 31, a rotor core 41 coupled to shaft 31, and a rotor coil 51 wound on rotor core 41. As shown in FIG. 2, rotor core 41 includes a hub 43 to which shaft 31 is coupled, and a plurality of poles 45 protruding from hub 43 in a radial direction. Poles 45 are spaced from each other at constant intervals in a circumferential direction. Slots 44 are formed between every two neighboring poles 45. Rotor coil 51 is wound on each pole 45 a plurality of times.

A power supply unit 35 for supplying power to rotor coil 51 is provided at shaft 31. Power supply unit 35 includes commutators or slip rings 36 coupled to shaft 31, and brushes 37 contacting the commutators or slip rings 36 to conduct power to rotor coil 51.

However, the conventional electric motor has the following problems. First, when rotor 30 rotates, coil ends or end turns of rotor coil 51 protruding from two ends of rotor core 41 in an axial direction are pulled in a radial direction. This may cause a short-circuit of rotor coil 51. Second, when the electric motor is driven, rotor coil 51 does not smoothly emit heat due to its relatively small contact area with the surrounding air. This may cause temperature increases of rotor coil 51. If rotor coil 51 has a drastic temperature increase, the electric motor may have a reduced output capability and perhaps permanent damage.

SUMMARY

Therefore, one objective of the detailed description is to provide an electric motor capable of preventing a short-circuit of a rotor coil occurring from a centrifugal force when a rotor rotates.

Another objective of the detailed description is to provide an electric motor capable of preventing a short-circuit of a rotor coil, and capable of enhancing a cooling performance of the rotor coil.

To achieve these and other advantages and in accordance with the purpose of this specification, as embodied and broadly described herein, there is provided an electric motor, comprising: a stator, a case surrounding the stator, and a rotor rotatably disposed with respect to the stator. The rotor includes a rotor core having a plurality of poles and slots, a shaft coupled to a central portion of the rotor core, a rotor coil wound on the rotor core, and a coil supporting member provided at the rotor core. The coil supporting member is configured to support the rotor coil such that the rotor coil is prevented from being separated from the rotor core in a radial direction when the rotor rotates.

The coil supporting members may be coupled to the rotor core before the rotor coil is wound on the rotor core. The rotor coil may be simultaneously wound on the rotor core and the coil supporting members.

The coil supporting members may include a hub coupled to the shaft, a plurality of spokes extending from the hub in a radial direction, and supporting portions protruding from the ends of the spokes in an axial direction, and configured to support the coil ends of the rotor coil. The coil supporting members may be coupled to the rotor core after the rotor coil is wound on the rotor core.

Each pole may be provided with a pole shoe extending in a circumferential direction. The coil supporting members may include coil end accommodation portions for accommodating the coil ends of the rotor coil, and supporting plates disposed between the pole shoes. The coil supporting members may be coupled to the rotor core in an axial direction of the rotor core.

The coil supporting members may be provided with an outer circumference having the same diameter as that of an outer circumference of the rotor core. The coil end accommodation portions and the supporting plates may be integrally formed with each other, or may be configured so as to be insertion-coupled.

The coil supporting members may further include reinforcing members disposed on the circumferences of the coil supporting members, and configured to reinforce the supporting portions.

The reinforcing members may have a fiber or wire-shape, and may be wound on the supporting portions a plurality of times. The reinforcing members may be formed as a non-magnetic metallic member. The reinforcing members may have a ring shape, and may be insulation-coated. Further, the reinforcing member may be configured such that an inner surface thereof contacts an outer surface of the supporting portions. A plurality of insertion protrusions inserted into a space between the supporting portions may be provided at the reinforcing members.

Each pole of the rotor core may be provided with a pole shoe extending in a circumferential direction, and the pole shoe of the rotor core may have a thickness smaller than that of the supporting portion in a radial direction. A spacer having a thickness corresponding to the difference between the two thicknesses of the supporting portion and the pole shoe may be provided at an inner side of the pole shoe of the rotor core.

The coil supporting members may be formed of a synthetic resin member, and reinforcing members may be insert injection-molded thereinto. The coil supporting members may be formed of a material having a higher heat transfer performance than the rotor core. The coil supporting member may include a body configured as a non-magnetic metallic member, and a coating layer formed by coating an insulating member on the surface of the body. The coil supporting member may be formed of a non-magnetic metallic member, and the surface thereof may be coated with an insulating member.

The coil supporting member may include a first coil supporting member disposed at one end of the rotor core, and having the coil end accommodation portions and the supporting plates integrally formed with each other. The coil supporting member may include a second coil supporting member disposed at another rend of the rotor core, and having the coil end accommodation portions, and insertion portions for inserting the ends of the supporting plates.

The rotor coil may be provided with a plurality of coil portions wound on the circumference of each pole. The coil supporting members may be coupled to two ends of the rotor core in an axial direction, such that coil ends are inserted into the coil end accommodation portions, and such that the supporting plate is inserted into a space between the coil portions.

The reinforcing members may be configured such that the outer surfaces thereof are insulation-coated by an insulating member.

Additional scope of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the invention.

DETAILED DESCRIPTION

Figure 1:
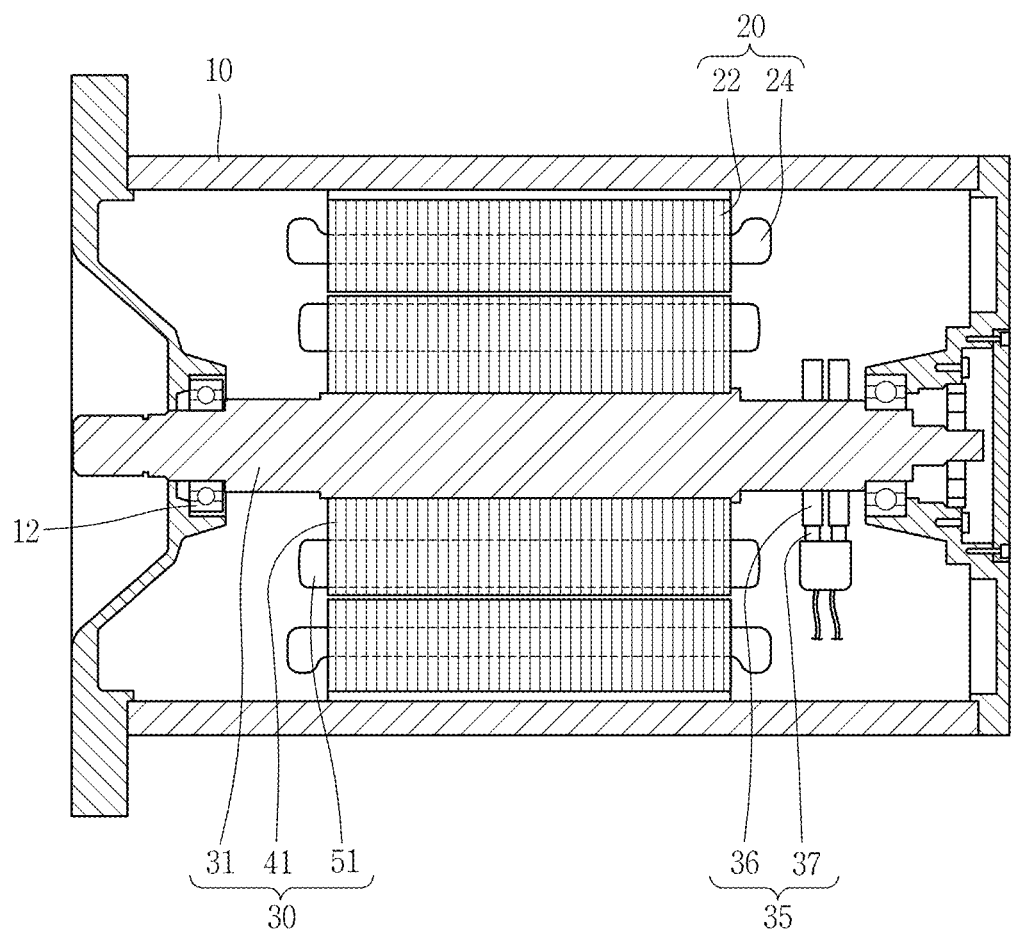
FIG. 1 is a sectional view of an electric motor in accordance with the conventional art.
Figure 2:
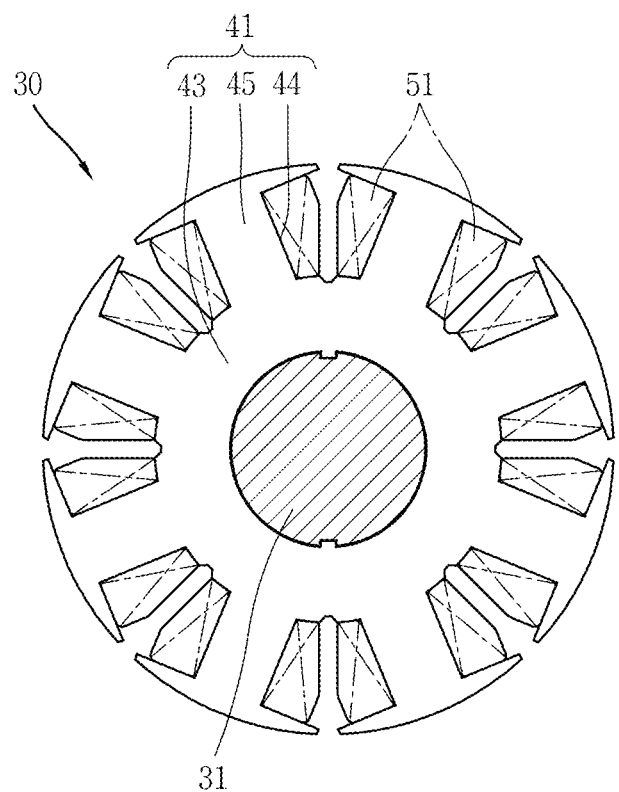
FIG. 2 is a sectional view of a rotor of FIG. 1.
Figure 3:
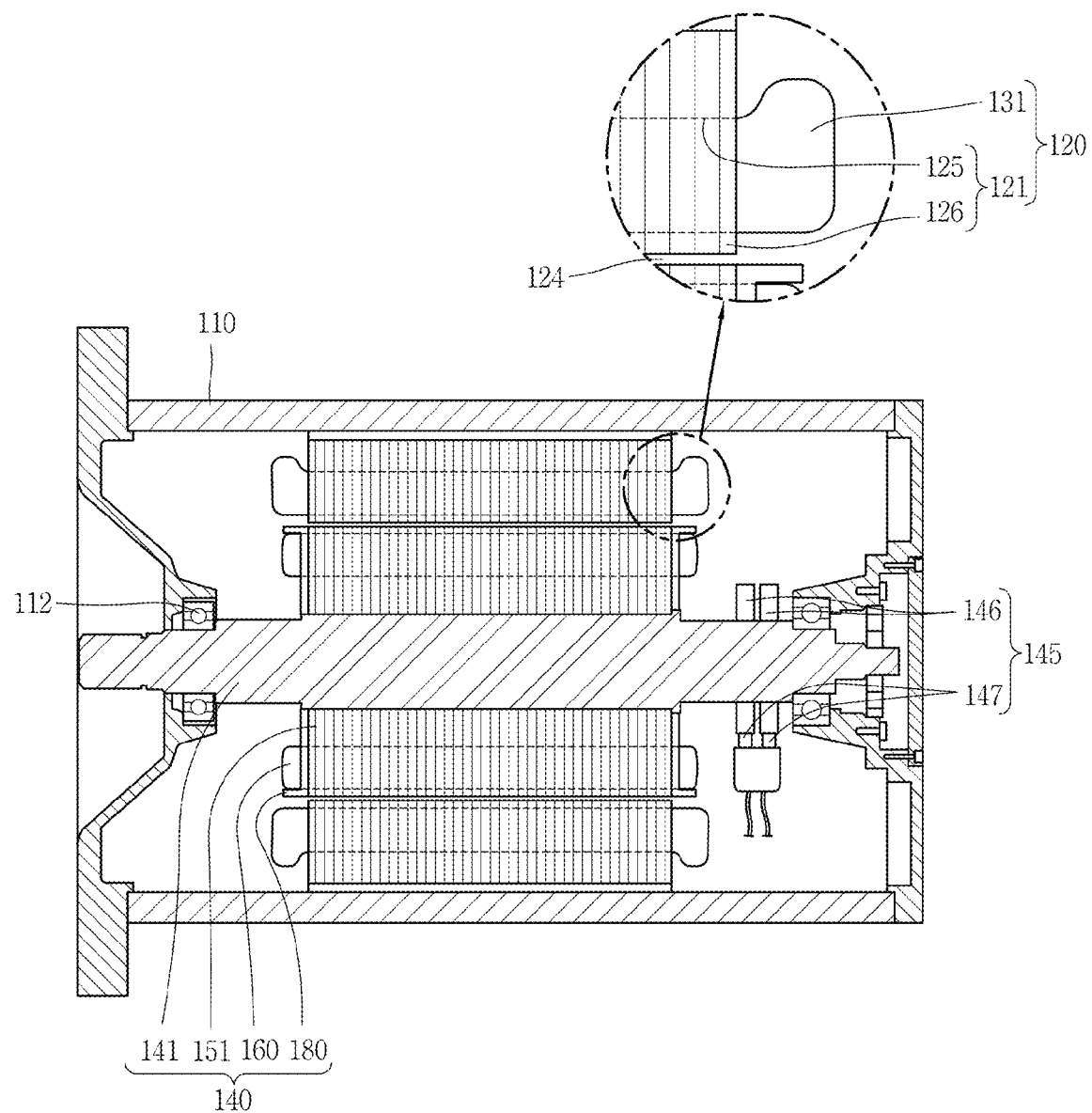
FIG. 3 is a sectional view of an electric motor according to an embodiment of the present invention.

Description will now be given in detail of the exemplary embodiments, with reference to the accompanying drawings. For the sake of brief description with reference to the drawings, the same or equivalent components may be provided with the same reference numbers, and description thereof may not be repeated.

Hereinafter, embodiments of the present invention will be explained in more detail with reference to the attached drawings.

As shown in FIGS. 3-8, an electric motor according to the present invention includes a stator 120, and a rotor 140 rotatably disposed with respect to stator 120. Rotor 140 includes a rotor core 151 having a plurality of poles 155 and slots 159. A shaft 141 is coupled to a central portion of rotor core 151. A rotor coil 160 is wound on rotor core 151. Coil supporting members 180 are provided at rotor core 151, and configured to support rotor coil 160 such that rotor coil 160 is prevented from being separated from rotor core 151 in a radial direction when rotor 140 rotates.

A case 110 may be provided at the outer periphery of stator 120. Case 110 may be formed to correspond to the shape of stator 120 so that stator 120 can be accommodated therein.

A bearing 112 for rotatably supporting shaft 141 may be provided at case 110. Bearing 112 may be provided at two sides of case 110, respectively. The two sides of case 110 are on opposite ends of shaft 141. Two sides of shaft 141 may be rotatably supported by bearing 112.

Stator 120 may include a stator core 121, and a stator coil 131 wound on stator core 121. Stator core 121 may be provided with a plurality of slots 125 and teeth 126. For example, stator coil 131 may be configured to be wound on plurality of slots 125.

A rotor accommodating space 124 for rotatably accommodating rotor 140 may be provided at a central region of stator core 121.

Rotor 140 may include a rotor core 151 having a plurality of poles 155 and slots 159, a shaft 141 coupled to a central portion of rotor core 151, a rotor coil 160 wound on slots 159 of rotor core 151, and coil supporting members 180 provided at rotor core 151, and configured to support rotor coil 160 so that rotor coil 160 is not separated from rotor core 151 in a radial direction when rotor 140 rotates.

A power supply unit 145 for supplying power to rotor coil 160 may be provided at shaft 141. Power supply unit 145 may include, for example, commutators or slip rings 146 coupled to shaft 141, and brushes 147 contacting slip rings 146 in order to conduct power to rotor 140.

Rotor core 151 may include, for example, a plurality of poles 155 spaced from each other at the same intervals, and a plurality of slots 159 disposed between poles 155. More specifically, rotor core 151 may include a hub 152, a plurality of poles 155 protruding from the circumference of hub 152 in a radial direction, and spaced from each other at the same intervals, and a plurality of slots 159 disposed between poles 155. A shaft hole 153 for inserting shaft 141 may be penetratingly-formed at hub 152. Protrusions 165 protruding in a radial direction and protrusion accommodation portions (not shown) for accommodating protrusions 165 and restricting protrusions 165 in a rotation direction, may be provided at contact regions between hub 152 and shaft 141. Under such a configuration, slip occurring between shaft 141 and hub 152 can be prevented when rotor 140 rotates.

More specifically, protrusions 165 protrude in a radial direction from an inner diameter of shaft hole 153 of hub 152. And, the protrusion accommodation portions may be concaved from an outer surface of shaft 141 by a predetermined depth in a radial direction, so that protrusions 165 can be accommodated therein.

A pole shoe 156 extending in a circumferential direction may be provided at the end of each pole 155. Each pole shoe 156 may extend to two sides from the center of pole 155. Each pole shoe 156 may be formed so that the thickness (in a radial direction) thereof can be gradually decreased towards the two sides. For example, an outer surface 157b of each pole shoe 156 may be formed in an arc shape, and an inner surface 157a thereof may be formed in a straight line shape.

Rotor coil 160 may be provided with a plurality of coil portions 162 wound on the circumference of each pole 155. Each coil portion 162 may be provided with coil ends 163 protruding from two ends of rotor core 151 in an axial direction. Each coil portion 162 may be serially connected to each other. Each coil portion 162 may be wound on each pole 155 in a different direction so that opposing poles (N and S) can be formed. Coil portions 162 may be wound around the pole shoes 156 so that the interval therebetween can be increased.

Coil supporting members 180 may be provided at two ends of rotor core 151. For example, coil supporting members 180 may be coupled to rotor core 151 before rotor coil 160 is wound on rotor core 151. That is, coil supporting members 180 are coupled to two opposing ends of rotor core 151, and subsequently rotor coil 160 may be wound on rotor core 151 and coil supporting members 180.

Figure 4:
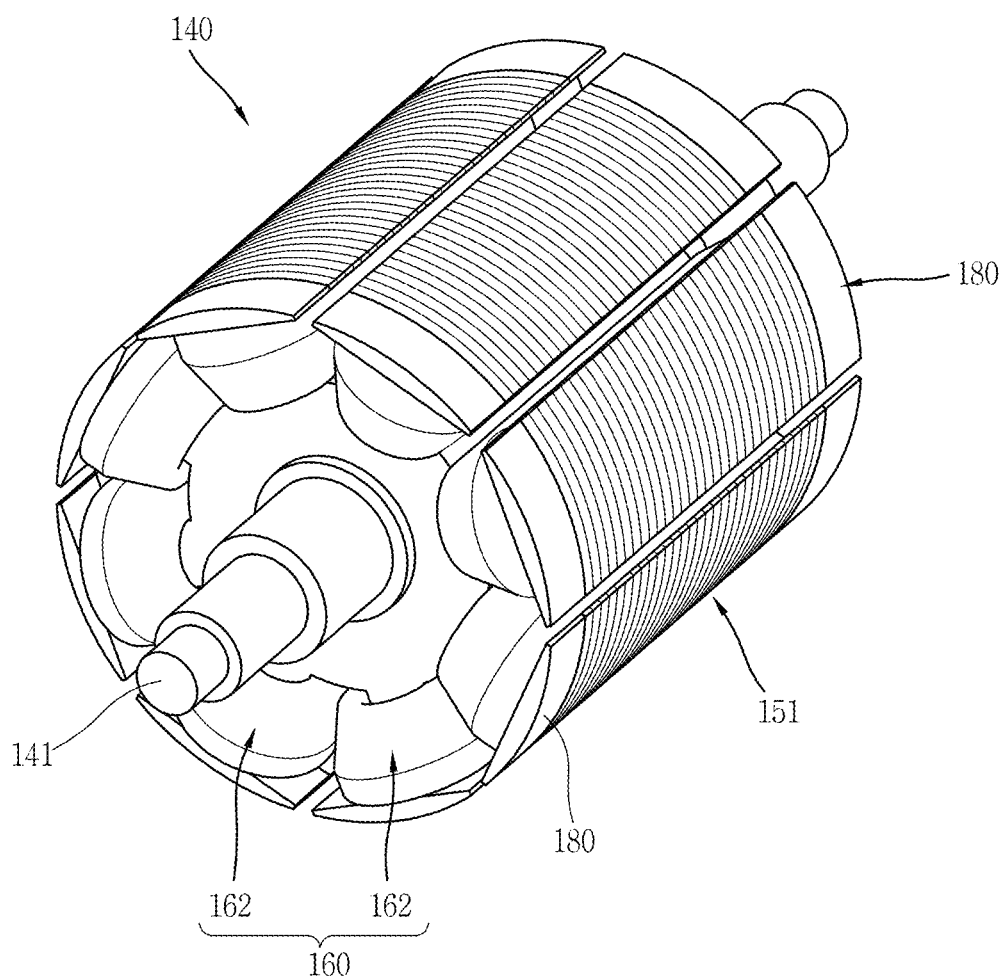
FIG. 4 is a perspective view of a rotor of FIG. 3.
Figure 5:
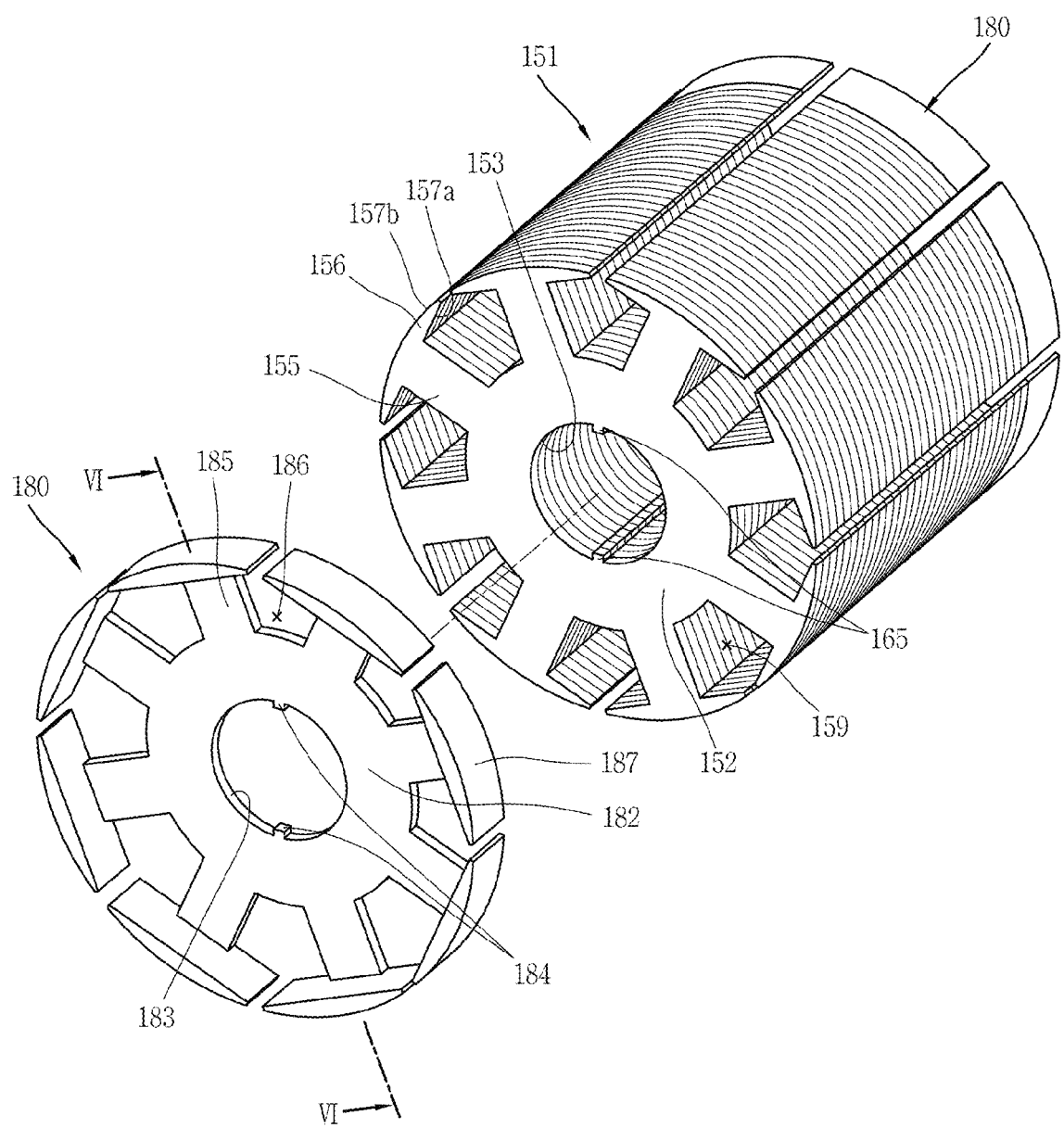
FIG. 5 is a perspective view showing a state before a rotor core and a coil supporting member of FIG. 4 are coupled to each other.

For example, as shown in FIGS. 4 and 5, coil supporting members 180 may include a hub 182 coupled to shaft 141, a plurality of spokes 185 extending from hub 182 in a radial direction, and supporting portions 187 protruding from the ends of spokes 185 in an axial direction, and configured to support coil ends 163 of rotor coil 160. Supporting portions 187 are disposed outside coil ends 163 in a radial direction of rotor core 151, and contact the outer circumference (outer surface) of coil ends 163. Under such a configuration, supporting portions 187 can support coil ends 163 so as to be maintained at the initial position, against a centrifugal force applied in a radial direction when rotor 140 rotates.

Coil supporting members 180 may be formed of a material having a higher heat transfer performance than rotor core 151 (e.g., aluminum). Accordingly, since heat of rotor coil 160 is transferred to coil supporting members 180, cooling of rotor coil 160 can be accelerated. Coil supporting members 180 may be configured as a non-magnetic metallic member (e.g., aluminum, stainless steel, etc.). Accordingly, leakage of a magnetic flux due to coil supporting members 180 can be prevented.

Figure 6:
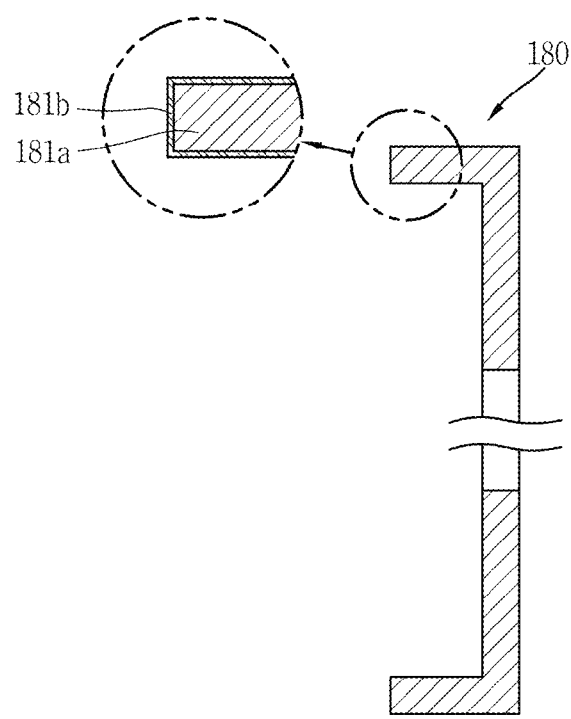
FIG. 6 is a sectional view taken along line 'VI-VI' in FIG. 5.

For example, as shown in FIG. 6, coil supporting members 180 may include a body 181a configured as a non-magnetic metallic member, and a coating layer 181b formed by coating an insulating member (electric insulating member) on the outer surface of the body 181a.

Figure 7:
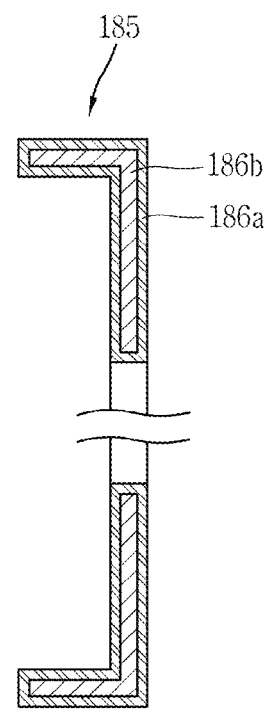
FIG. 7 is a modification example of the coil supporting member of FIG. 5, which corresponds to FIG. 6.

As shown in FIG. 7, coil supporting member 185 may include a body 186a formed of a synthetic resin member, and reinforcing members 186b insert injection-molded in body 186a. Reinforcing members 186b may be, for example, formed as metallic members.

A shaft hole 183 for inserting shaft 141 may be penetratingly-formed at hub 182 of coil supporting members 180. Protrusions 184 protruding in a radial direction and protrusion accommodation portions (not shown) for accommodating protrusions 184 may be provided at contact regions between hub 182 and shaft 141. Under such a configuration, slip occurring between shaft 141 and hub 182 when rotor 140 rotates, can be prevented.

Figure 8:
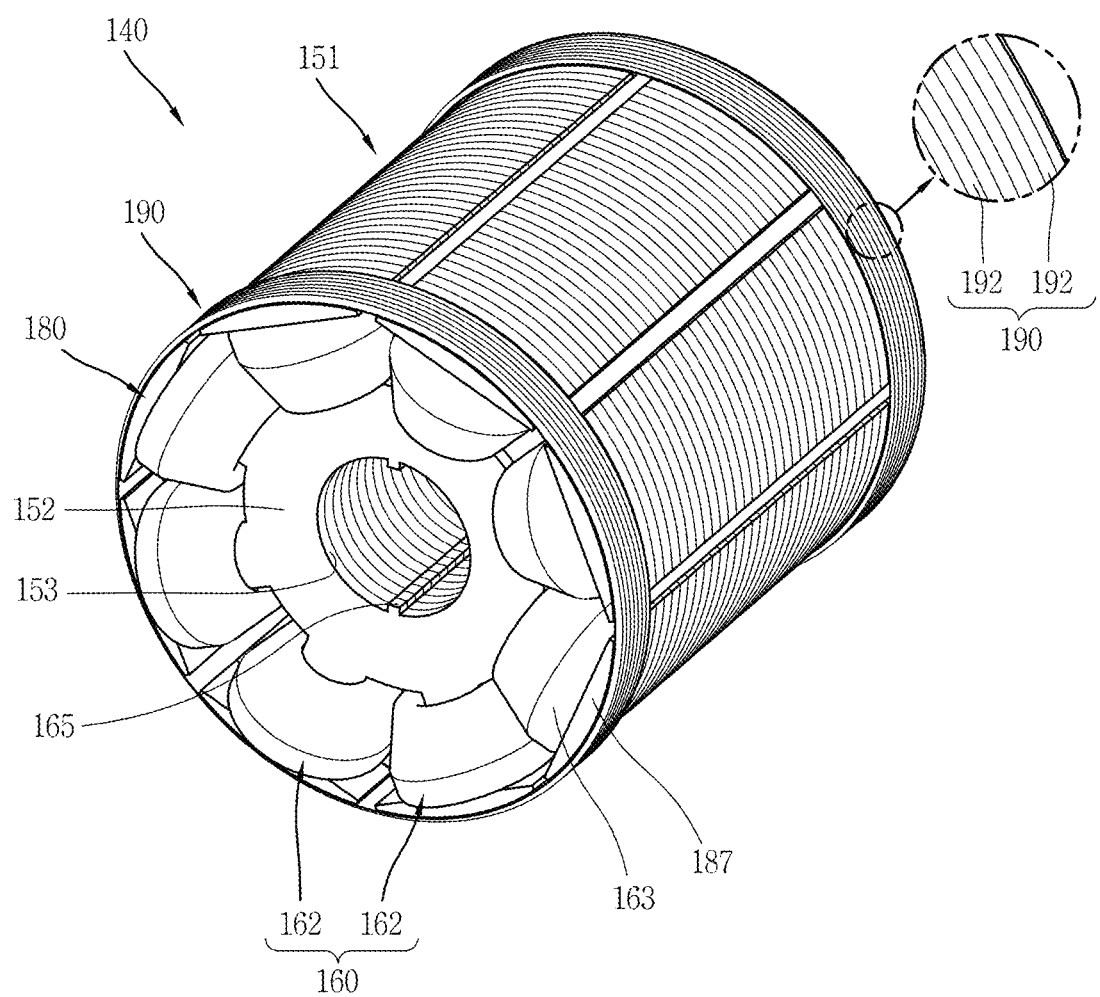
FIG. 8 is a modification example of the rotor of FIG. 2.

Reinforcing members 190 may be provided at the outer peripheries of coil supporting members 180. Under such a configuration, when rotor 140 rotates, coil supporting members 180 and rotor coil 160 can be more stably supported. For example, as shown in FIG. 8, reinforcing members 190 may be formed in a ring shape by winding fiber or wire-shaped reinforcing members on the outer surfaces of coil supporting members 180 (outer surfaces of the supporting members) a plurality of times.

More specifically, reinforcing members 190 may be formed by winding glass fibers 192 on the outer surfaces of coil supporting members 180 a plurality of times. As coil supporting members 180 are supported by glass fibers 192 having a high specific strength, coil supporting members 180 and rotor coil 160 can be effectively supported without increasing the weight of reinforcing members 190.

Under such a configuration, coil supporting members 180 are provided at two ends of rotor core 151, and rotor coil 160 is wound on rotor core 151 and coil supporting members 180. Reinforcing members 190 may be provided on the circumference of coil supporting members 180.

To drive the electric motor, power is supplied to stator coil 131 and rotor coil 160, respectively. When power is supplied to stator coil 131, a magnetic field for rotating rotor 140 is formed. When power is supplied to rotor coil 160, coil portions 162 are formed to alternately have opposing poles (N and S). Each coil portion interacts (i.e., attracts and repulses) with a magnetic field formed by stator coil 131. As a result, rotor 140 can rotate about shaft 141.

When rotor 140 rotates, coil supporting members 180 prevent the respective coil portions 162 of rotor coil 160 from moving in a radial direction by a centrifugal force. Accordingly, the occurrence of a short-circuit of rotor coil 160 can be prevented.

Figure 9:
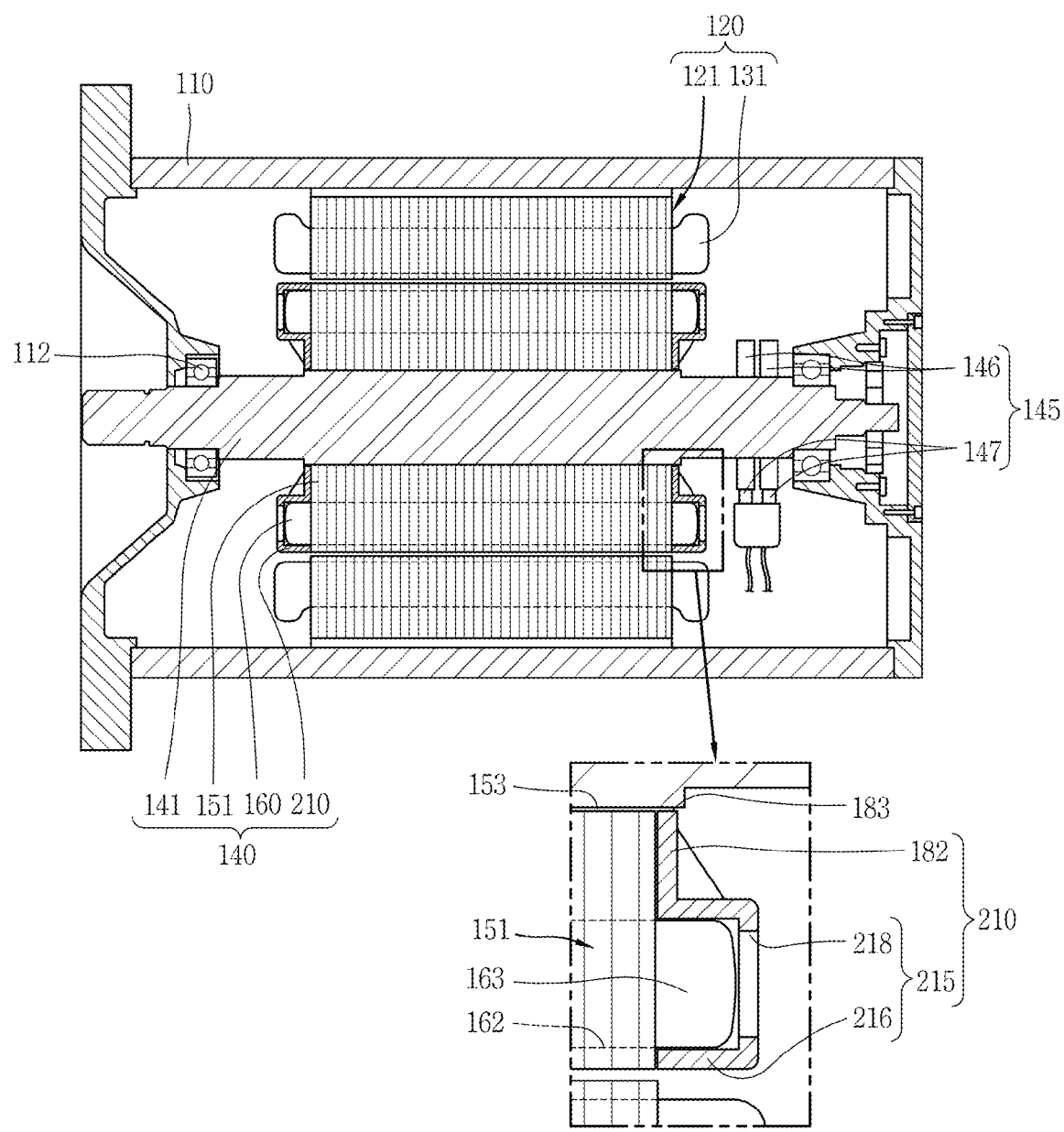
FIG. 9 is a sectional view of an electric motor according to another embodiment of the present invention.
Figure 10:
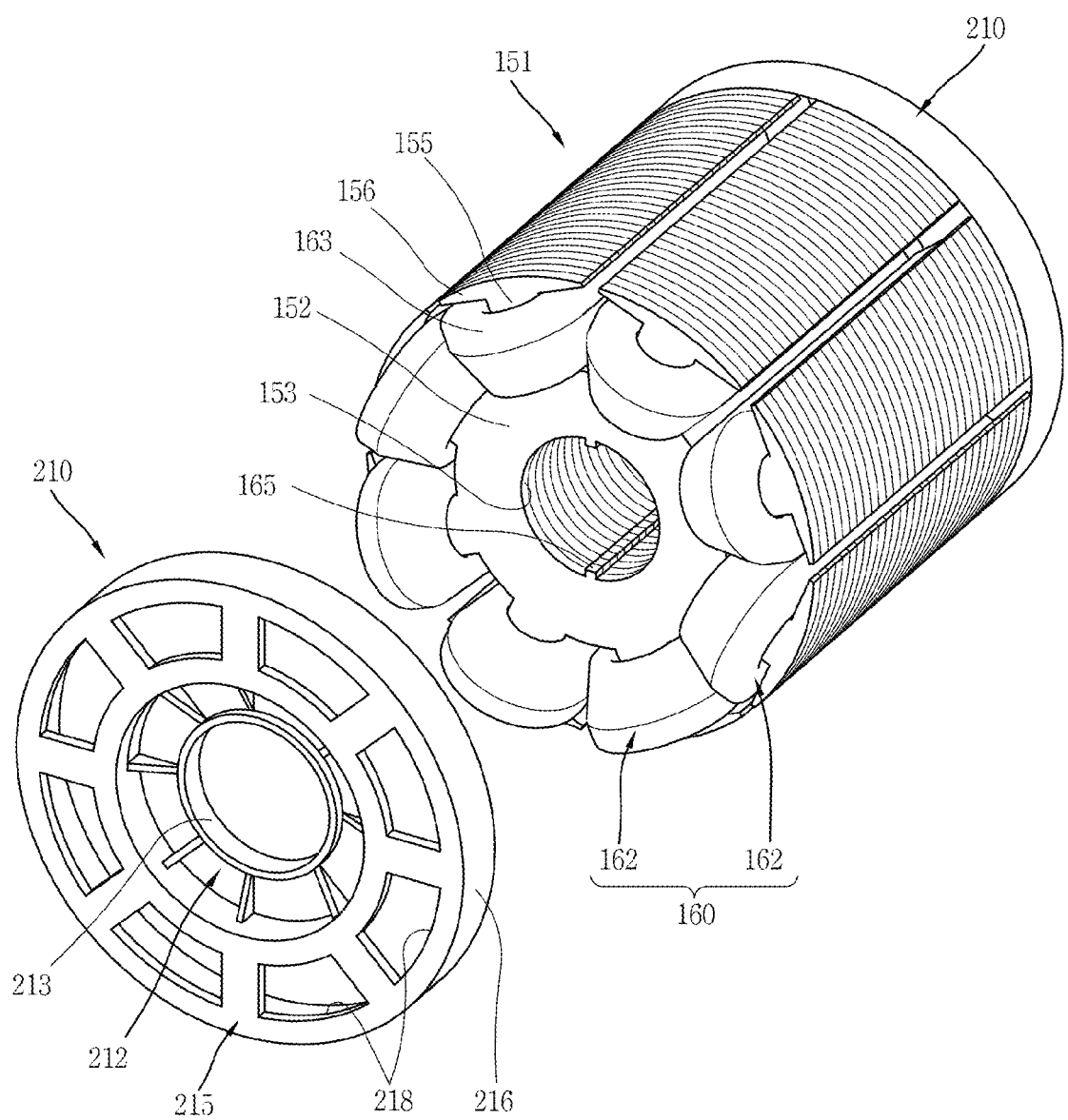
FIG. 10 is a perspective view showing a state before a rotor core and coil supporting members of FIG. 9 are coupled to each other.

FIGS. 9 and 10 illustrate another embodiment of the present invention. The same reference numerals will be given to the same parts as those of the aforementioned embodiment, and explanations thereof will be omitted.

As shown in FIG. 9, the electric motor according to another embodiment of the present invention may include a stator 120, and a rotor 140 rotatably disposed with respect to stator 120. Rotor 140 may include a rotor core 151 having a plurality of poles 155 and slots 159, a shaft 141 coupled to a central portion of rotor core 151, a rotor coil 160 wound on rotor core 151, and coil supporting members 210 provided at the rotor core 151, and configured to support rotor coil 160 so that rotor coil 160 is not separated from rotor core 151 in a radial direction when rotor 140 rotates.

A case 110 may be provided at the outer periphery of stator 120. A bearing 112 for rotatably supporting rotor 140 may be provided at case 110.

A power supply unit 145 having slip rings 146 and brushes 147, and configured to supply power to rotor coil 160 may be provided at shaft 141.

Rotor core 151 may be provided with a plurality of poles 155 and slots 159. A rotor coil 160 having a plurality of coil portions 162 wound on the circumferences of poles 155, may be wound on rotor core 151.

Coil supporting members 210 may be wound on rotor coil 160, and then may be coupled to rotor core 151. For example, as shown in FIG. 10, coil supporting members 210 may include a hub 212 coupled to shaft 141, and coil end coupling portions 215 disposed on the circumference of hub 212 and coupled to coil ends 163. A shaft hole 213 for inserting shaft 141 may be penetratingly-formed at hub 212.

Coil end coupling portion 215 may be provided with an outer wall portion 216 disposed to contact the outer surface of each coil end 163 in a radial direction of rotor core 151. Under such a configuration, coil ends 163 can be supported against a centrifugal force applied to coil ends 163 when rotor 140 rotates. For example, outer wall portion 216 may be formed in a ring shape. Coil end coupling portion 215 may have through holes 218 through which part of coil ends 163 can be exposed to the outside.

For example, coil supporting members 210 may be formed of a non-magnetic metallic member, and the surfaces thereof may be coated with an insulating member. Under such a configuration, once rotor coil 160 is wound on rotor core 151, coil supporting members 210 may be coupled to two opposing ends of rotor core 151.

When the electric motor is driven to rotate rotor 140, coil ends 163 of rotor coil 160 are supported against a centrifugal force by outer wall portions 216 of coil supporting members 210. Accordingly, the occurrence of a short-circuit of rotor coil 160 can be prevented.

FIGS. 11 to 14 illustrate another embodiment of the present invention.

Figure 11:
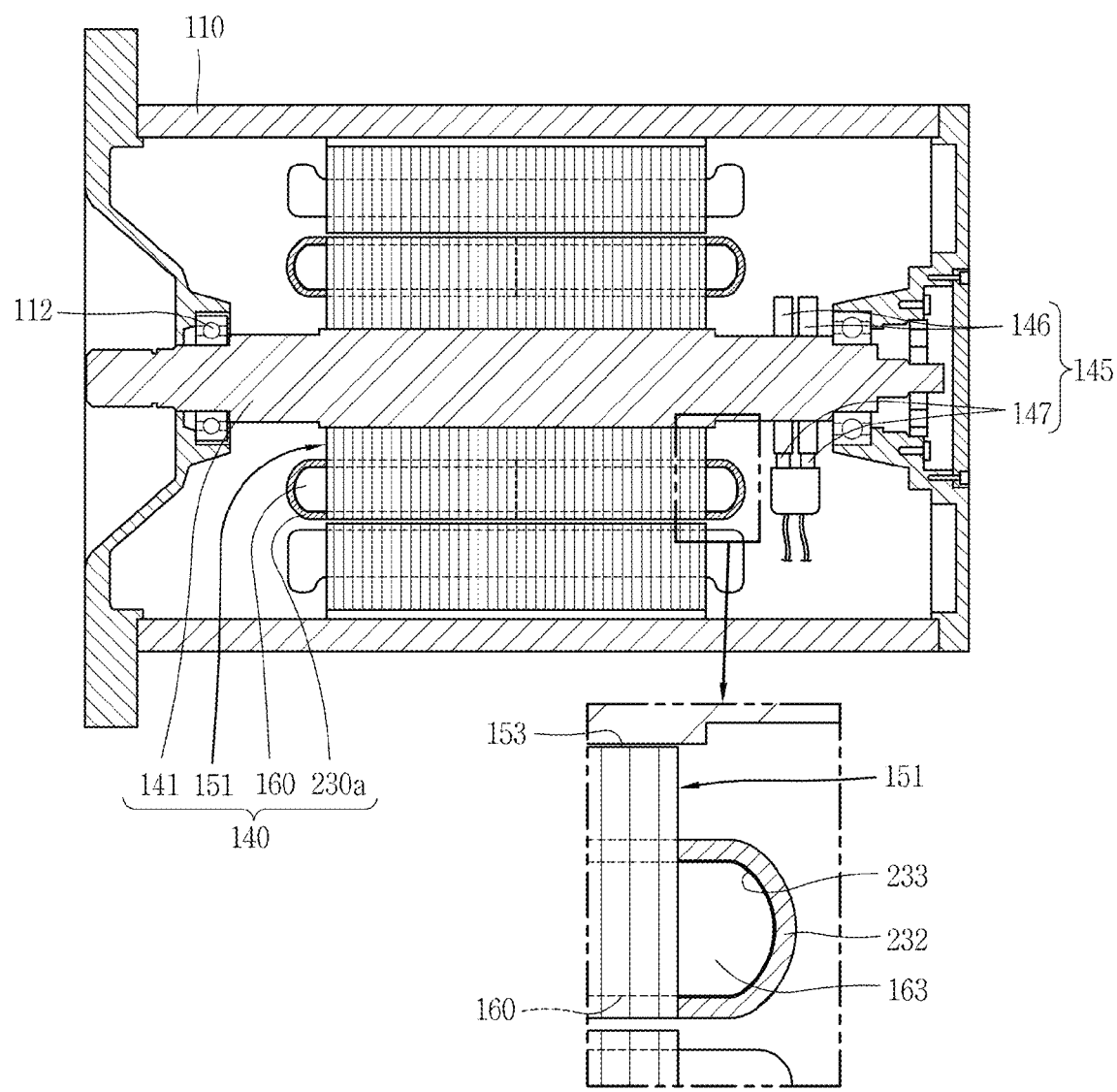
FIG. 11 is a sectional view of an electric motor according to still another embodiment of the present invention.

As shown in FIG. 11, the electric motor according to this embodiment includes a stator 120, and a rotor 140 rotatably disposed with respect to stator 120. Rotor 140 includes a rotor core 151 having a plurality of poles 155 and slots 159, a shaft 141 coupled to a central portion of rotor core 151, a rotor coil 160 wound on rotor core 151, and a coil supporting member 230a provided at rotor core 151, and configured to support rotor coil 160 so that rotor coil 160 is not separated from rotor core 151 in a radial direction when rotor 140 rotates.

A case 110 may be provided at the outer periphery of stator 120.

Coil supporting members 230a may be provided at two opposing ends of rotor core 151. Coil supporting members 230a may be coupled to rotor core 151 after rotor coil 160 is wound on rotor core 151. Coil supporting members 230a may be coupled to two opposing sides of rotor core 151 in an axial direction of rotor 140.

Figure 12:
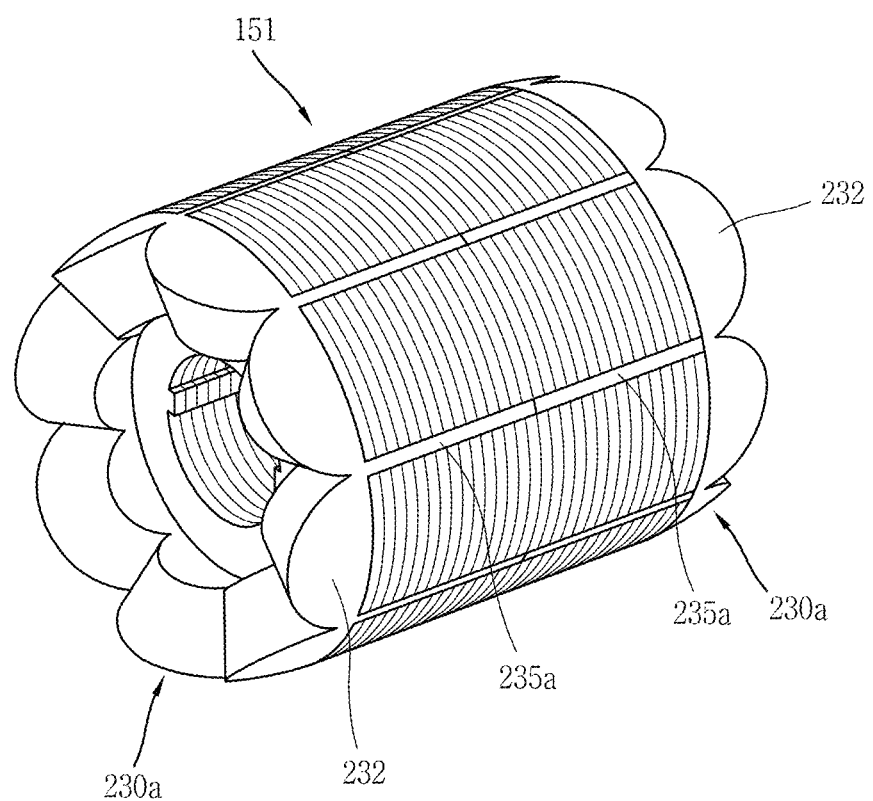
FIG. 12 is a perspective view of a rotor of the electric motor of FIG. 11.
Figure 13:
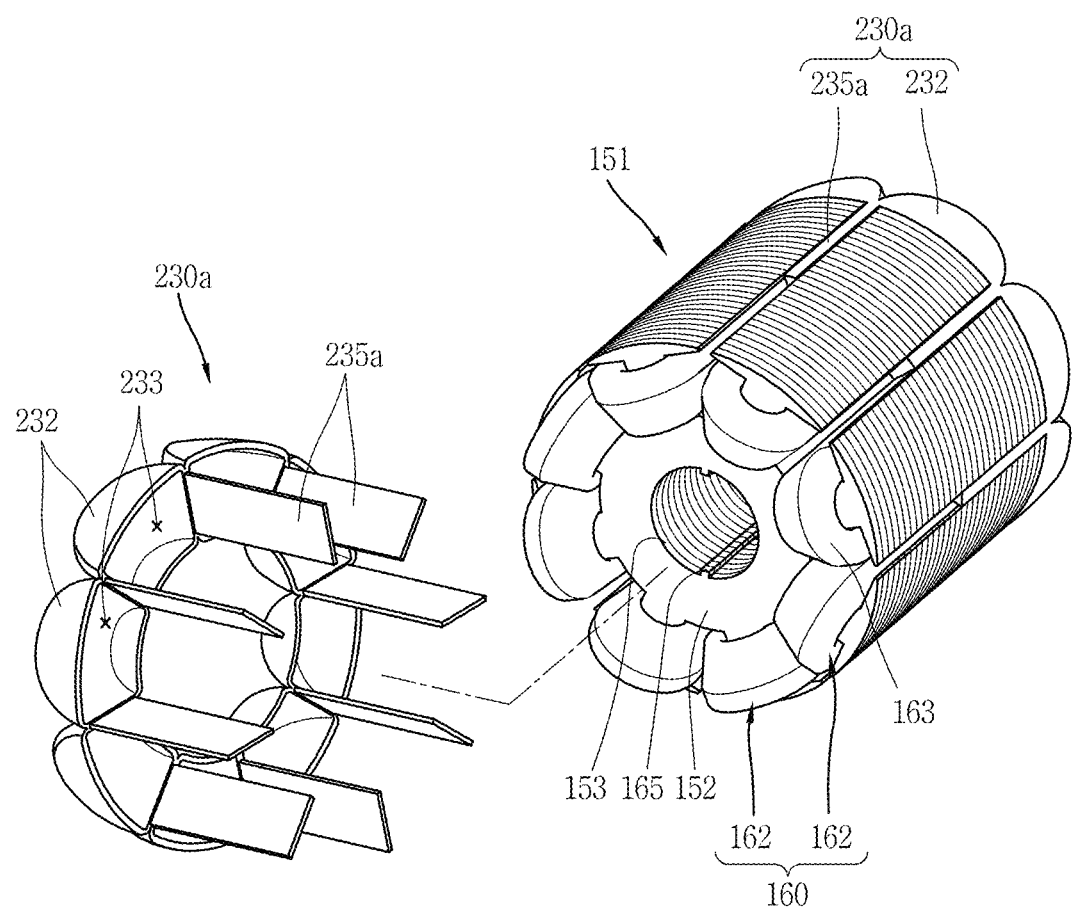
FIG. 13 is a perspective view showing a state before a rotor core and coil supporting members of FIG. 12 are coupled to each other.

For example, as shown in FIGS. 12 and 13, coil supporting member 230a may include coil end accommodation portions 232 for accommodating coil ends 163 of rotor coil 160, and supporting plates 235a disposed between pole shoes 156. Coil end accommodation portions 232 may be formed in a shape (e.g., arc shape) corresponding to the shape of coil ends 163. Each coil end accommodation portion 232 may be provided with an accommodation space 233 therein, the accommodation space for accommodating each coil end 163. Each coil end accommodation portion 232 may be formed so that the rotor core side thereof can be open.

Coil supporting member 230a may have the same outer diameter as rotor core 151.

Coil supporting member 230a may be provided with a plurality of supporting plates 235a, each supporting plate 235a is inserted into a space between coil portions 162 wound on poles 155.

More specifically, each supporting plate 235a may be configured to be simultaneously connected to two neighboring coil end accommodation portions 232. Under such a configuration, separation of each coil end accommodation portion 232 from rotor core 151 due to a centrifugal force when rotor 140 rotates, can be prevented. Further, gaps between coil portions 162 are blocked by supporting plates 235a. This may prevent outward movements of coil portions 162 wound on poles 155 by a centrifugal force in a radial direction when rotor 140 rotates.

Each supporting plate 235a may be disposed in a radial direction of rotor core 151. Edges inside each supporting plate 235a may contact rotor core 151, respectively. Supporting plate 235a may be formed to have a length shorter than that of rotor core 151 in an axial direction. For example, supporting plate 235a may have a length corresponding to the half of a length of rotor core 151 in an axial direction.

Figure 14:
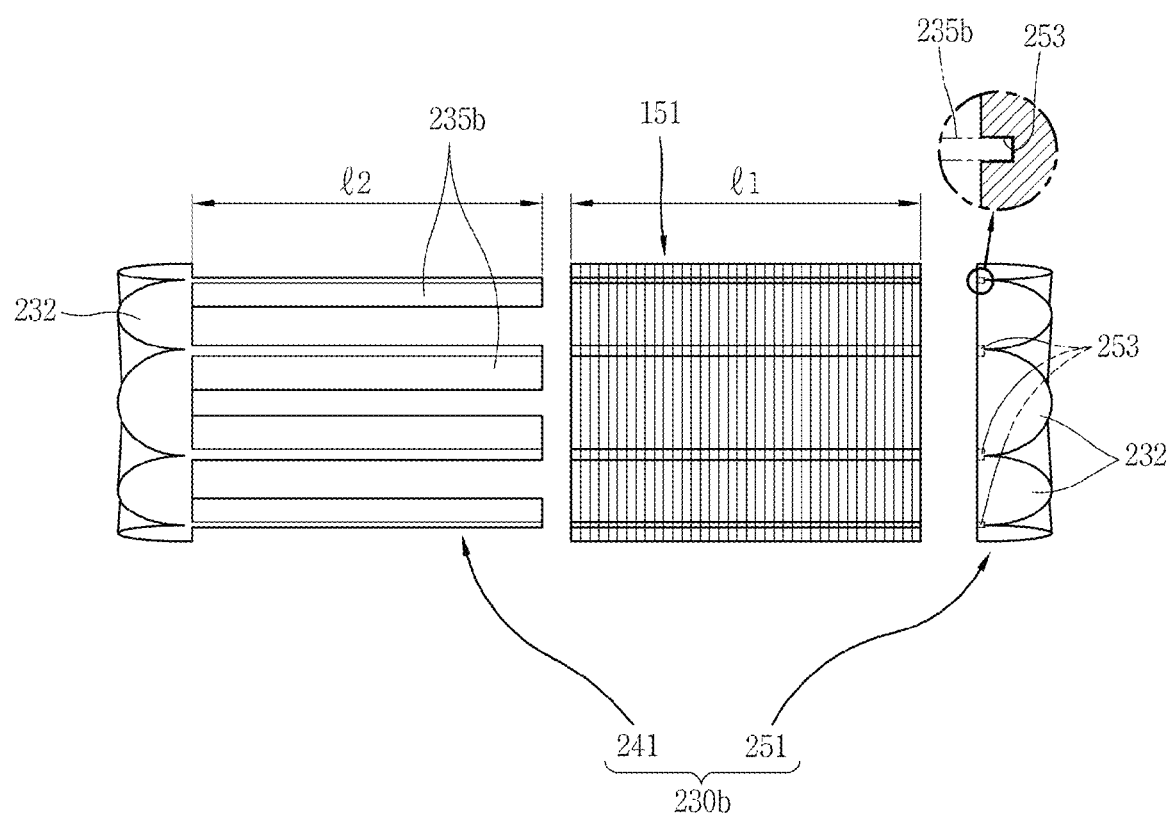
FIG. 14 is a modification example of a rotor of FIG. 11.

As shown in FIG. 14, a coil supporting member 230b may include a first coil supporting member 241 disposed at one end of rotor core 151, and a second coil supporting member 251 disposed at another rend of rotor core 151. First coil supporting member 241 includes coil end accommodation portions 232 for accommodating coil ends 163 of rotor coil 160, and supporting plates 235b disposed between pole shoes 156. Second coil supporting member 251 includes coil end accommodation portions 232, and insertion portions 253 for inserting ends of supporting plates 235b.

Supporting plates 235b of first coil supporting member 241 may have a length long enough to protrude towards the opposing end of rotor core 151 by passing through the rotor core 151.

A plurality of insertion portions 253 for inserting the ends of the supporting plates 235b having protruded through rotor core 151 may be formed at second coil supporting member 251, respectively. Insertion portions 253 may be configured as grooves and/or holes.

Second coil supporting member 251 may be integrally coupled to supporting plates 235b of first coil supporting member 241, thereby supporting coil ends 163 accommodated therein against a centrifugal force.

Coil supporting members 230a and 230b may be formed of a material having a higher heat transfer performance than rotor core 151. For example, coil supporting members 230a and 230b may be formed of aluminum. Under such a configuration, heat of rotor coil 160 is transferred to two sides of rotor core 151 through coil supporting members 230a and 230b (supporting plates). As a result, the temperature of rotor coil 160 can be prevented from excessively increasing.

The aforementioned fiber or wire-shaped reinforcing members 190 may be provided on the circumferences of coil supporting members 230a and 230b. Under such a configuration, if rotor coil 160 has been completely wound on poles 155 of rotor core 151, coil supporting members 230a and 230b may be coupled to two opposing ends of rotor core 151, respectively. Coil ends 163 of rotor coil 160 may be accommodated in coil end accommodation portions 232, and each supporting plate 235a may be inserted into a space between two neighboring coil portions 162.

When the electric motor is driven to rotate rotor 140, coil ends 163 of rotor coil 160 are supported by coil end accommodation portions 232 against a centrifugal force. As a result, rotor coil 160 can be prevented from being separated from rotor core 151 or from moving in a radial direction, and thus a short-circuit of rotor coil 160 can be prevented.

FIGS. 15 to 18 illustrate yet still another embodiment of the present invention.

Figure 15:
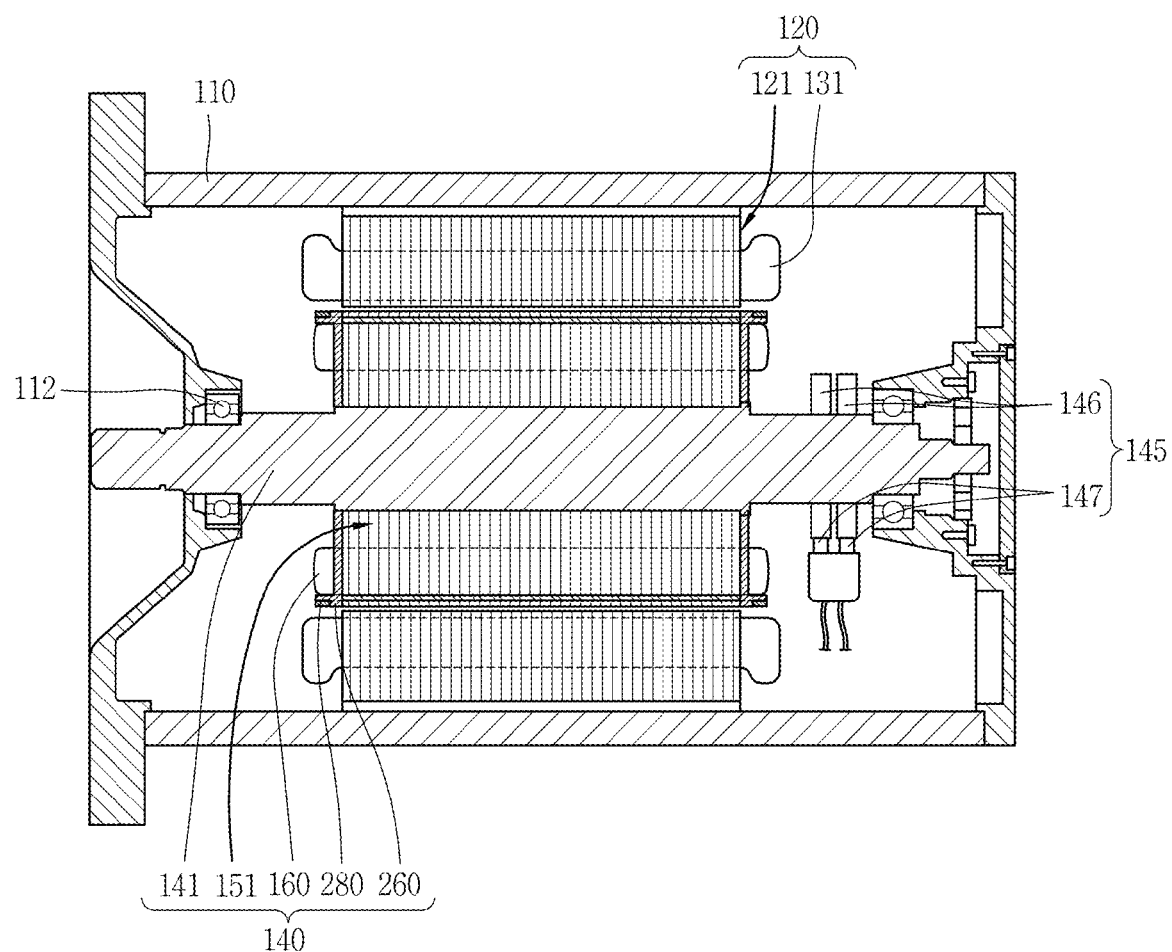
FIG. 15 is a sectional view of an electric motor according to another embodiment of the present invention.

As shown in FIG. 15, the electric motor according to this embodiment includes a stator 120, and a rotor 140 rotatably disposed with respect to stator 120. Rotor 140 includes a rotor core 151 having a plurality of poles 155 and slots 159, a shaft 141 coupled to a central portion of rotor core 151, a rotor coil 160 wound on rotor core 151, and coil supporting members 260 provided at rotor core 151, and configured to support rotor coil 160 so that rotor coil 160 can be prevented from being separated from rotor core 151 in a radial direction when rotor 140 rotates.

A case 110 may be provided at the outer periphery of stator 120.

A plurality of poles 155 and slots 159 may be provided at rotor core 151. Rotor coil 160 may be provided with a plurality of coil portions 162 wound on poles 155. A pole shoe 156 may be provided at the end of each pole 155 of rotor core 151. Pole shoes 156 may be formed to have a preset interval (s1) therebetween.

Coil supporting members 260 may be provided at two ends of rotor core 151 in an axial direction. Coil supporting members 260 may be configured as non-magnetic metallic members (e.g., aluminum, stainless steel, etc.). Coil supporting members 260 may be insulation-coated with an insulating member.

Figure 16:
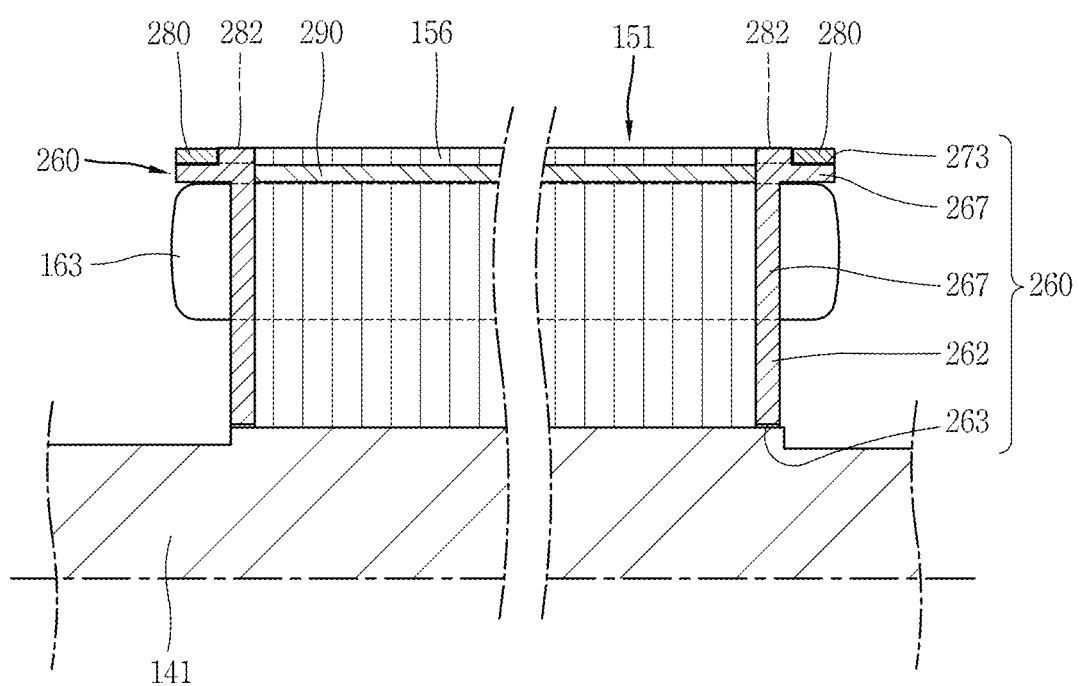
FIG. 16 is an enlarged view of a rotor of FIG. 15
Figure 17:
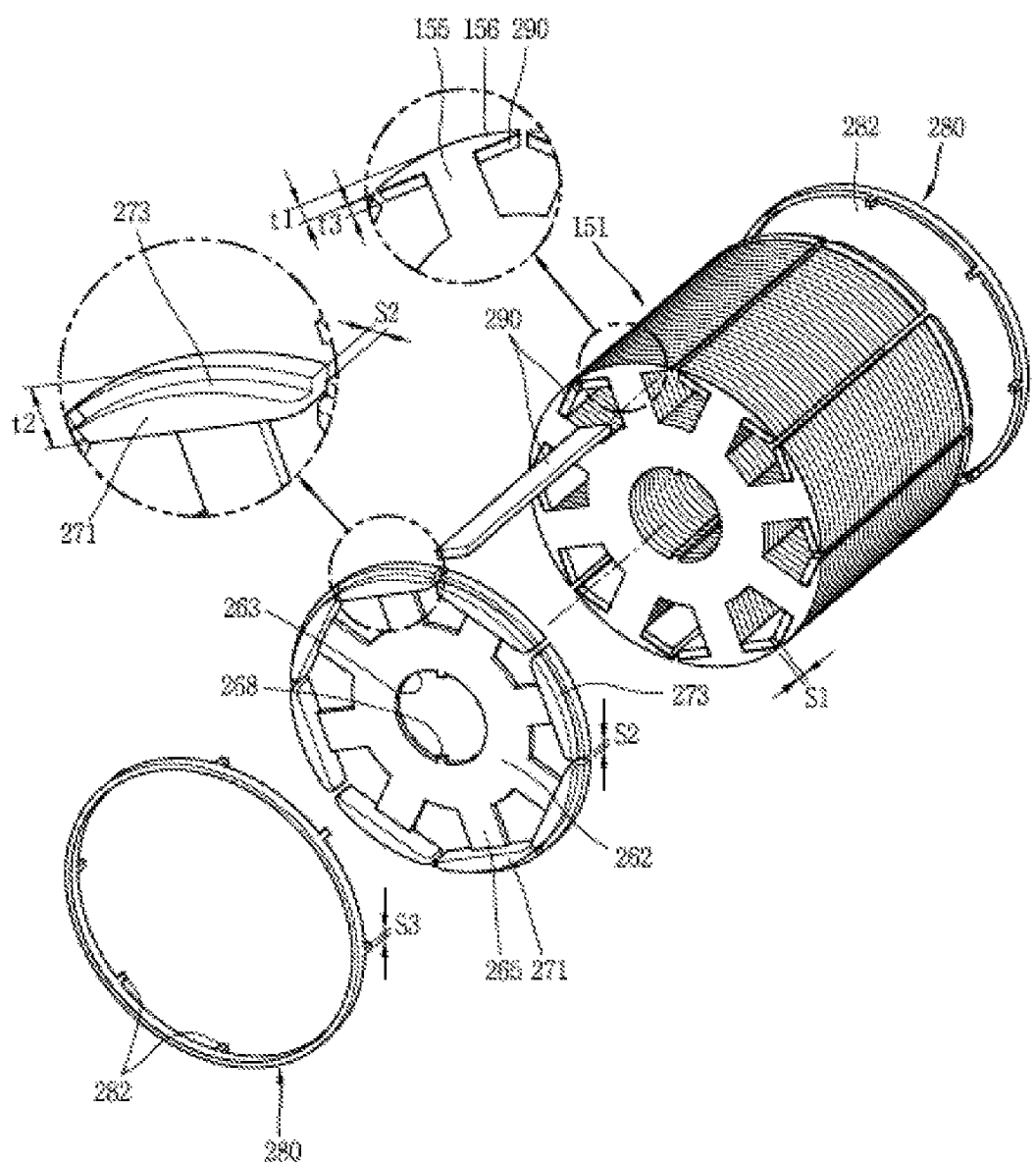
FIG. 17 is disassembled perspective view of the rotor of FIG. 16.

As shown in FIGS. 16 and 17, coil supporting members 260 may include a hub 262 coupled to shaft 141, a plurality of spokes 265 extending from hub 262 in a radial direction, and supporting portions 267 protruding from the ends of spokes 265 in an axial direction, and configured to support coil ends 163 of rotor coil 160. A shaft hole 263 for inserting shaft 141 may be penetratingly-formed at hub 262.

Protrusions 268 protruding in a radial direction may be provided at shaft hole 263. As protrusions 268 are inserted into protrusion accommodation portions (not shown) formed on the outer surface of shaft 141, slip occurring when rotor 140 rotates can be prevented.

Spokes 265 may be formed to correspond to the poles of rotor core 151. For example, each spoke 265 may be formed to have the same interval and width as each pole 155.

Supporting portions 267 for supporting coil ends 163 of rotor coil 160 may be provided at the ends of the spokes 265. Each supporting portion 267 may protrude from the end of each spoke 265 in an axial direction. Each supporting portion 267 may have the same length as each pole shoe 156 in a circumferential direction. Supporting portions 267 may have a preset interval (s2) therebetween.

More specifically, interval (s2) between the supporting portions 267 may be the same as interval (s1) between pole shoes 156.

Guide portions 271 may be formed at two ends of each supporting portion 267 in a circumferential direction. Each guide portion 271 may be formed in a curved shape so that its length in a circumferential direction can be gradually decreased in a protruding direction of each supporting portion 267. Under such a configuration, interval (s2) between supporting portions 267 can be gradually increased in a protruding direction of supporting portions 267. Guide portion 271 may facilitate coupling of reinforcing members 280 (to be later below) with supporting portions 267.

Reinforcing members 280 may be coupled to coil supporting members 260. This may allow rotor coil 160 to be more stably supported. Reinforcing members 280 may have a ring shape. Reinforcing members 280 may simultaneously contact the outer surfaces of supporting portions 267.

Reinforcing member coupling portions 273 for coupling reinforcing members 280 may be formed on the outer surfaces of supporting portions 267.

Reinforcing member coupling portions 273 may have steps in a shape that the outer surface of supporting portions 267 are cut to be decreased in a radial direction, in correspondence to the thickness of reinforcing members 280.

Reinforcing members 280 may be implemented as steel plates having a high intensity and formed in a ring shape. Reinforcing members 280 may be insulation-coated with an insulating member. Reinforcing member 280 may be provided with a plurality of insertion protrusions 282 inserted into interval (s2) between supporting portions 267 of coil supporting member 260. Each insertion protrusion 282 may be configured to have a width (s3) corresponding to interval (s2) between supporting portions 267.

Pole shoe 156 and supporting portion 267 may have thicknesses different from each other. Preferably, pole shoe 156 may have a relatively small thickness (t1) for an enhanced output. Preferably, supporting portions 267 may have a relatively great thickness (t2) so as to more stably support coil ends 163 with an increased intensity (supporting intensity).

A spacer 290 may be provided at an inner side of each pole shoe 156.

Figure 18:
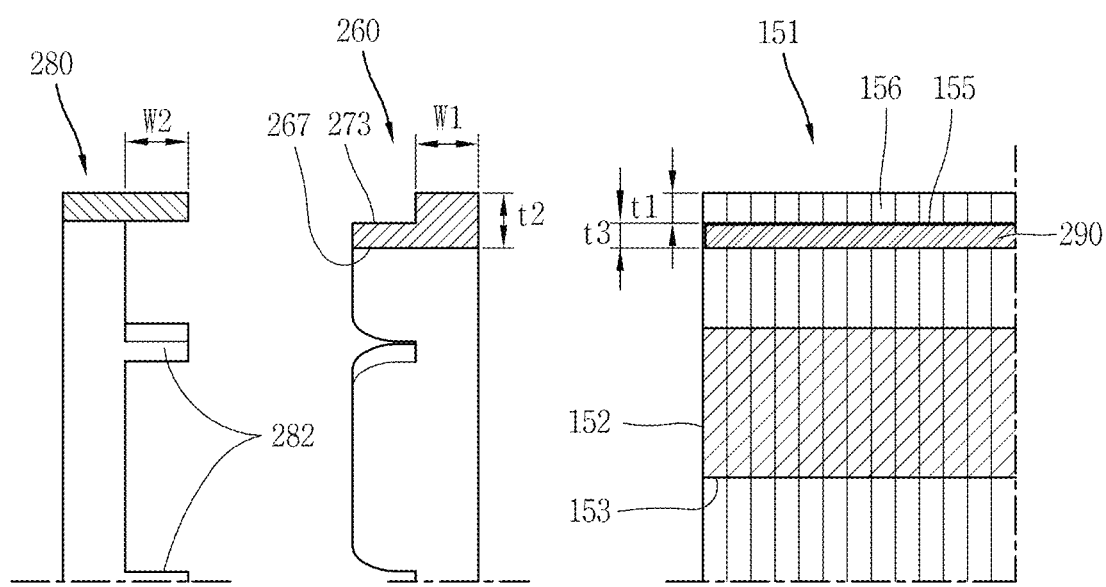
FIG. 18 is a sectional view of FIG. 17.

As shown in FIG. 18, spacer 290 may be configured to have a thickness (t3) corresponding to the difference between thickness (t1) of pole shoe 156 and thickness (t2) of supporting portion 267. Under such a configuration, the inner surface of spacer 290 and the inner surface of supporting portion 267 can be disposed on the same plane. As a result, rotor coil 160 can be easily wound on rotor core 151, and rotor coil 160 having been wound on rotor core 151 can be stably supported.

Spacer 290 may be formed to have a length corresponding to a length of rotor core 151 in an axial direction (or laminated thickness). Under such a configuration, two opposing ends of spacer 290 can be coupled to coil supporting members 260, and then may contact the inner surfaces of coil supporting members 260, respectively. For example, each spacer 290 may be configured to be adhered to the inner surface 157a of each pole shoe 156. Under such a configuration, each spacer 290 may be provided on inner surface 157a of each pole shoe 156 of rotor core 151.

Coil supporting members 260 may be provided at two opposing ends of rotor core 151, and rotor coil 160 may be wound on rotor core 151 along the inner surfaces of spacer 290 and supporting portions 267, respectively.

Once rotor coil 160 has been completely wound on rotor core 151, reinforcing members 280 may be coupled to coil supporting members 260. Insertion protrusions 282 of reinforcing member 280 are guided by guide portions 271 formed at two opposing ends of each supporting portion 267, so that reinforcing members 280 can be easily inserted into coil supporting members 260.

To drive the electric motor, power is supplied to stator coil 131 and rotor coil 160, respectively. As a magnetic field is formed by stator coil 131, opposing magnetic poles (N and S poles) are formed by coil portions 162 interact with each other, such that rotor 140 rotates about shaft 141.

Coil supporting members 260 prevents coil portions 162 of rotor coil 160 from moving in a radial direction by a centrifugal force when rotor 140 rotates. Accordingly, the occurrence of a short-circuit of rotor coil 160 can be prevented.

The electric motor according to the present invention has the following advantages.

First, according to one embodiment, the coil supporting members for supporting the rotor coil are provided outside the rotor coil in a radial direction. Accordingly, a short-circuit of the rotor coil due to a centrifugal force when the rotor rotates, can be prevented.

Second, since the coil supporting members are pre-installed at the rotor core, the rotor coil can be wound on the coil supporting members when being wound on the rotor core. As a result, the rotor coil can stably maintain the initially-wound position. This can prevent the rotor coil from being transformed, and/or can prevent a short-circuit of the rotor coil and can prolong the lifespan of the rotor coil.

Third, the coil supporting members are coupled to the rotor core after the rotor coil is wound on the rotor core. This can facilitate a winding operation of the rotor coil.

Fourth, the supporting plates are provided at the coil supporting members so as to be disposed between the coil portions. This can prevent the rotor coil from moving or being transformed in a radial direction.

Fifth, since the reinforcing members are provided on the circumference of the coil supporting members, the rotor coil can be more stably supported.

Sixth, since the coil supporting members are formed of a material having a higher heat transfer performance than the rotor core, temperature increases of the rotor coil can be prevented.

Seventh, each pole shoe of the rotor core is configured to have a thickness smaller than that of each supporting portion of the coil supporting member, and a spacer is configured to have a thickness corresponding to the difference between the two thicknesses. Accordingly, the thickness of the pole shoe can be reduced. As a result, an output of the electric motor can be enhanced, a winding operation of the rotor coil can be easily performed, and the rotor coil can be stably supported.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

We claim:

1. An electric motor, comprising:
    a stator;
    a case surrounding the stator; and
    a rotor rotatably disposed with respect to the stator,
    wherein the rotor includes:
        a rotor core having a plurality of poles and slots;
        a shaft coupled to a central portion of the rotor core;
        a rotor coil wound on the rotor core; and
        coil supporting members provided at the rotor core, to support the rotor coil such that the rotor coil is prevented from being separated from the rotor core in a radial direction when the rotor rotates,
    wherein each of the coil supporting members comprises:
        a hub coupled to the shaft;
        a plurality of spokes extending from the hub in a radial direction; and
        supporting portions protruding from ends of the spokes in an axial direction, to support coil ends of the rotor coil,
    wherein each pole of the rotor core is provided with a pole shoe extending in a circumferential direction,
    wherein the pole shoe of the rotor core has a thickness smaller than that of the supporting portion in a radial direction, and
    wherein a spacer having a thickness corresponding to the difference between the two thicknesses of the supporting portion and the pole shoe, is provided at an inner side of the pole shoe of the rotor core.

2. The electric motor of claim 1, wherein the coil supporting members are coupled to the rotor core.

3. The electric motor of claim 2, wherein the coil supporting members are formed of a synthetic resin member, and reinforcing members are insert injection-molded into the coil supporting members.

4. The electric motor of claim 2, wherein the coil supporting member includes:
    a body formed of a non-magnetic metallic member; and
    a coating layer formed by coating an insulating member on the surface of the body.

5. The electric motor of claim 2, wherein the coil supporting member is formed of a non-magnetic metallic member, and the surface thereof is coated with an insulating member.

6. The electric motor of claim 2, wherein the rotor coil is simultaneously wound on the rotor core and the coil supporting member.

7. The electric motor of claim 1, wherein the coil supporting members further include reinforcing members disposed on the circumference of the supporting portions, to reinforce the supporting portions.

8. The electric motor of claim 7, wherein the reinforcing members have a fiber or wire-shape, and are wound on the supporting portions a plurality of times.

9. The electric motor of claim 7, wherein the reinforcing member has a ring shape, and is insulation-coated, and
    wherein the reinforcing member having an inner surface thereof that contacts an outer surface of the supporting portions.

10. The electric motor of claim 9, wherein a plurality of insertion protrusions inserted into a space between the supporting portions are provided at the reinforcing members.

11. The electric motor of claim 9, wherein the reinforcing members are formed as a non-magnetic metallic member, and having the outer surfaces thereof insulation-coated by an insulating member.

12. The electric motor of claim 1, wherein the coil supporting members are formed of a material having a higher heat transfer performance than the rotor core.

13. The electric motor of claim 1, wherein the coil supporting members are coupled to the rotor core after the rotor coil is wound on the rotor core.

* * * * *